(12) United States Patent
Levkova et al.

(10) Patent No.: US 10,246,014 B2
(45) Date of Patent: Apr. 2, 2019

(54) SYSTEM AND METHOD FOR DRIVER DISTRACTION DETERMINATION

(71) Applicant: Nauto, Inc., Palo Alto, CA (US)

(72) Inventors: Ludmila Levkova, Palo Alto, CA (US); Stefan Heck, Palo Alto, CA (US); Benjamin O. Alpert, Palo Alto, CA (US); Ravi Kumar Satzoda, Palo Alto, CA (US); Suchitra Sathyanarayana, Palo Alto, CA (US); Vivek Sekar, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

(21) Appl. No.: 15/805,348

(22) Filed: Nov. 7, 2017

(65) Prior Publication Data

US 2018/0126901 A1 May 10, 2018

Related U.S. Application Data

(60) Provisional application No. 62/418,655, filed on Nov. 7, 2016.

(51) Int. Cl.
*B60Q 9/00* (2006.01)
*G06K 9/00* (2006.01)
*G01C 21/16* (2006.01)

(52) U.S. Cl.
CPC ........... *B60Q 9/00* (2013.01); *G06K 9/00228* (2013.01); *G06K 9/00597* (2013.01); *G06K 9/00845* (2013.01); *G01C 21/16* (2013.01)

(58) Field of Classification Search
CPC .. B60Q 9/00; G06K 9/00597; G06K 9/00845; G06K 9/00228; G01C 21/16
See application file for complete search history.

(56) References Cited

U.S. PATENT DOCUMENTS

| | | |
|---|---|---|
| 5,584,035 A | 12/1996 | Duggan et al. |
| 5,638,116 A | 6/1997 | Shimoura et al. |
| 5,898,390 A | 4/1999 | Oshizawa et al. |
| 6,018,728 A | 1/2000 | Spence et al. |
| 6,240,367 B1 | 5/2001 | Lin |
| 6,480,784 B2 | 11/2002 | Mizuno |
| 6,496,117 B2 | 12/2002 | Gutta et al. |
| 6,502,033 B1 | 12/2002 | Phuyal |
| 6,720,920 B2 | 4/2004 | Breed et al. |
| 6,927,694 B1 | 8/2005 | Smith et al. |

(Continued)

FOREIGN PATENT DOCUMENTS

| | | |
|---|---|---|
| DE | 102009005730 | 7/2010 |
| WO | 2014154771 A1 | 10/2014 |

*Primary Examiner* — Ryan W Sherwin
(74) *Attorney, Agent, or Firm* — Jeffrey Schox; Diana Lin

(57) ABSTRACT

A method for determining distraction of a driver of a vehicle, including sampling sensor measurements at an onboard system of the vehicle; generating an output indicative of a distracted state; determining that the driver of the vehicle is characterized by the distracted state, based on the output; generating, at a second distraction detection module of a remote computing system, a second output indicative that the driver is characterized by the distracted state, based on the sensor measurements; computing a distraction score, at a scoring module of the remote computing system, in response to generating the second output and based on the sensor measurements and the distracted state.

17 Claims, 6 Drawing Sheets

(56) References Cited

U.S. PATENT DOCUMENTS

| | | |
|---|---|---|
| 7,085,637 B2 | 8/2006 | Breed et al. |
| 7,148,913 B2 | 12/2006 | Keaton et al. |
| 7,212,651 B2 | 5/2007 | Viola et al. |
| 7,421,321 B2 | 9/2008 | Breed et al. |
| 7,423,540 B2 | 9/2008 | Kisacanin |
| 7,460,940 B2 | 12/2008 | Larsson et al. |
| 7,471,929 B2 | 12/2008 | Fujioka et al. |
| 7,502,677 B2 | 3/2009 | Weichenberger et al. |
| 7,502,688 B2 | 3/2009 | Hirokawa |
| 7,551,093 B2 | 6/2009 | Maass |
| 7,558,672 B2 | 7/2009 | Egami et al. |
| 7,639,148 B2 | 12/2009 | Victor |
| 7,646,922 B2 | 1/2010 | Au et al. |
| 7,844,077 B2 | 11/2010 | Kochi et al. |
| 7,853,072 B2 | 12/2010 | Han et al. |
| 7,868,821 B2 | 1/2011 | Hoshizaki |
| 7,912,288 B2 | 3/2011 | Winn et al. |
| 7,974,748 B2 | 7/2011 | Goerick et al. |
| 8,022,831 B1 | 9/2011 | Wood-Eyre |
| 8,174,568 B2 | 5/2012 | Samarasekera et al. |
| 8,195,394 B1 | 6/2012 | Zhu et al. |
| 8,254,670 B2 | 8/2012 | Prokhorov |
| 8,266,132 B2 | 9/2012 | Ofek et al. |
| 8,301,344 B2 | 10/2012 | Simon et al. |
| 8,344,849 B2 | 1/2013 | Larsson et al. |
| 8,369,608 B2 | 2/2013 | Gunaratne |
| 8,447,519 B2 | 5/2013 | Basnayake et al. |
| 8,487,775 B2 * | 7/2013 | Victor .................... A61B 3/113 180/272 |
| 8,498,813 B2 | 7/2013 | Oohashi et al. |
| 8,594,920 B2 | 11/2013 | Shida |
| 8,606,492 B1 | 12/2013 | Botnen |
| 8,666,644 B2 | 3/2014 | Goto |
| 8,676,498 B2 | 3/2014 | Ma et al. |
| 8,744,642 B2 | 6/2014 | Nemat-Nasser et al. |
| 8,854,199 B2 | 10/2014 | Cook et al. |
| 8,862,380 B2 | 10/2014 | Jung |
| 8,934,709 B2 | 1/2015 | Saptharishi et al. |
| 8,952,819 B2 * | 2/2015 | Nemat-Nasser ..... B60K 28/066 340/425.1 |
| 9,053,554 B2 | 6/2015 | Uchida et al. |
| 9,079,571 B2 | 7/2015 | Trost et al. |
| 9,111,147 B2 | 8/2015 | Thornton et al. |
| 9,121,713 B2 | 9/2015 | Samarasekera et al. |
| 9,146,558 B2 | 9/2015 | Field et al. |
| 9,158,962 B1 | 10/2015 | Nemat-Nasser et al. |
| 9,180,887 B2 | 11/2015 | Nemat-Nasser et al. |
| 9,201,932 B2 | 12/2015 | Silver et al. |
| 9,235,750 B1 | 1/2016 | Sutton et al. |
| 9,305,214 B1 | 4/2016 | Young et al. |
| 9,327,743 B2 | 5/2016 | Green et al. |
| 9,349,113 B2 | 5/2016 | Bashkin |
| 9,358,976 B2 | 6/2016 | Stierlin |
| 9,439,036 B2 | 9/2016 | Spears et al. |
| 9,465,978 B2 | 10/2016 | Hachisuka et al. |
| 9,472,102 B2 | 10/2016 | McClain et al. |
| 9,491,374 B1 | 11/2016 | Avrahami et al. |
| 9,514,626 B2 | 12/2016 | Wu et al. |
| 9,535,878 B1 * | 1/2017 | Brinkmann ............. G06F 17/00 |
| 9,573,541 B2 | 2/2017 | Graumann et al. |
| 9,679,480 B2 | 6/2017 | Hakeem |
| 9,718,468 B2 | 8/2017 | Barfield, Jr. et al. |
| 9,731,727 B2 | 8/2017 | Heim et al. |
| 9,734,414 B2 | 8/2017 | Samarasekera et al. |
| 9,734,455 B2 | 8/2017 | Levinson et al. |
| 9,845,097 B2 | 12/2017 | Prakah-Asante et al. |
| 9,881,218 B2 | 1/2018 | Ogata et al. |
| 9,892,558 B2 | 2/2018 | Troy et al. |
| 9,928,432 B1 * | 3/2018 | Sathyanarayana ... G05D 1/0088 |
| 2003/0169907 A1 * | 9/2003 | Edwards ............ G06K 9/00248 382/118 |
| 2004/0051659 A1 | 3/2004 | Garrison |
| 2006/0106534 A1 | 5/2006 | Kawamata et al. |
| 2007/0050108 A1 | 3/2007 | Larschan et al. |
| 2008/0084283 A1 * | 4/2008 | Kalik ....................... B60Q 9/00 340/435 |
| 2008/0243378 A1 | 10/2008 | Zavoli |
| 2010/0209881 A1 | 8/2010 | Lin et al. |
| 2010/0209891 A1 | 8/2010 | Lin et al. |
| 2013/0093886 A1 | 4/2013 | Rothschild |
| 2013/0147661 A1 | 6/2013 | Kangas et al. |
| 2014/0049601 A1 | 2/2014 | Pfeil |
| 2014/0139655 A1 | 5/2014 | Mimar |
| 2014/0297170 A1 | 10/2014 | Sakima et al. |
| 2015/0049195 A1 | 2/2015 | Ishigaki et al. |
| 2015/0284001 A1 | 10/2015 | Watanabe et al. |
| 2015/0294422 A1 | 10/2015 | Carver et al. |
| 2016/0063761 A1 | 3/2016 | Sisbot et al. |
| 2016/0086021 A1 | 3/2016 | Grohman et al. |
| 2016/0169690 A1 | 6/2016 | Bogovich et al. |
| 2016/0176397 A1 | 6/2016 | Prokhorov et al. |
| 2016/0244022 A1 | 8/2016 | Lippman et al. |
| 2016/0267335 A1 | 9/2016 | Hampiholi |
| 2016/0300242 A1 | 10/2016 | Truong et al. |
| 2016/0335475 A1 * | 11/2016 | Krenzer ............ G06K 9/00335 |
| 2017/0039850 A1 | 2/2017 | Vanden Berg et al. |
| 2017/0048239 A1 | 2/2017 | Jeon et al. |
| 2017/0053167 A1 | 2/2017 | Ren et al. |
| 2017/0053555 A1 | 2/2017 | Angel et al. |
| 2017/0055868 A1 | 3/2017 | Hatakeyama |
| 2017/0061222 A1 | 3/2017 | Hoye et al. |
| 2017/0064363 A1 | 3/2017 | Wexler et al. |
| 2017/0080900 A1 | 3/2017 | Huennekens et al. |
| 2017/0088142 A1 | 3/2017 | Hunt et al. |
| 2017/0089710 A1 | 3/2017 | Slusar |
| 2017/0113664 A1 | 4/2017 | Nix |
| 2017/0146801 A1 | 5/2017 | Stempora |
| 2017/0248952 A1 | 8/2017 | Perkins et al. |
| 2017/0287163 A1 | 10/2017 | Kaufmann et al. |
| 2017/0293819 A1 | 10/2017 | Deng |
| 2017/0309072 A1 | 10/2017 | Li et al. |
| 2018/0052515 A1 * | 2/2018 | Wanner ............ G06K 9/00597 |
| 2018/0107882 A1 | 4/2018 | Ogata et al. |

* cited by examiner

SYSTEM AND METHOD FOR DRIVER DISTRACTION DETERMINATION

CROSS-REFERENCE TO RELATED APPLICATIONS

This application claims the benefit of U.S. Provisional Application Ser. No. 62/418,655, filed 7 Nov. 2016, which is incorporated herein in its entirety by this reference.

TECHNICAL FIELD

This invention relates generally to the vehicle interaction field, and more specifically to a new and useful system and method for driver distraction determination in the vehicle interaction field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
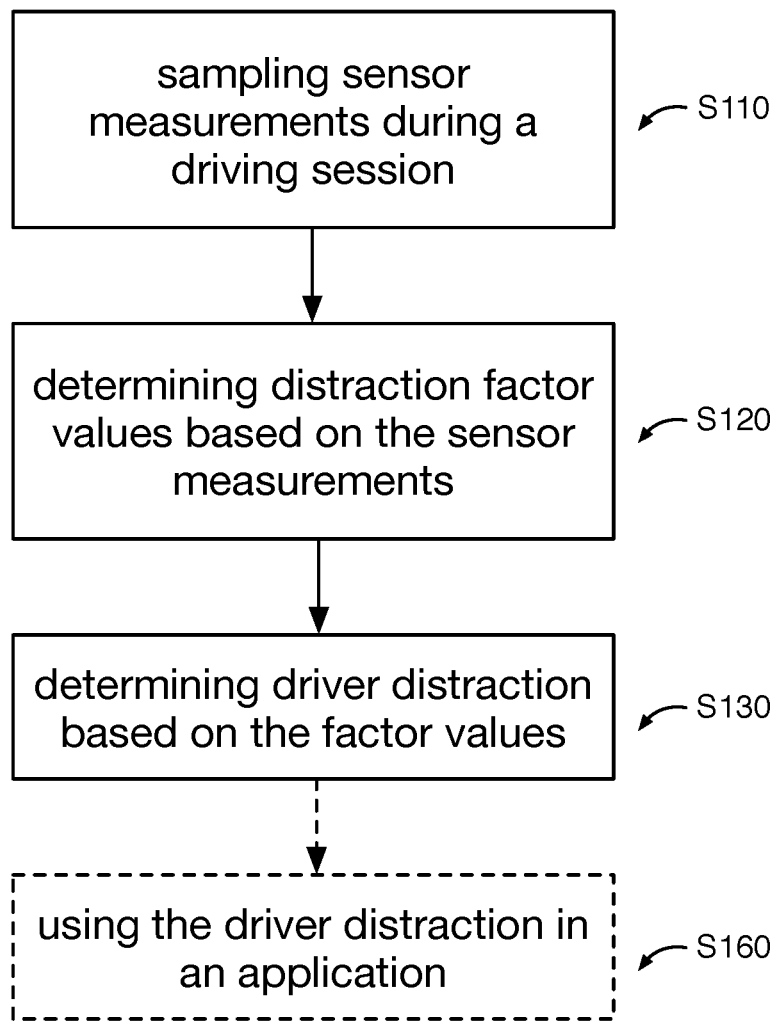
FIG. 1 is a flowchart representation of the method for driver distraction determination.

As shown in FIG. 1, the method 100 for driver distraction determination includes: sampling sensor measurements during a driving session S110; determining distraction factor values based on the sensor measurements S120; and determining driver distraction based on the factor values S130. The method 100 functions to determine whether a driver is distracted during a driving session. In some variations, the method 100 can determine the frequency, severity, location, surrounding context (e.g., the concurrent traffic parameters, the concurrent vehicle interior parameters, etc.), and/or any other suitable parameter of the driver distraction event (e.g., driver distraction parameter). The method can optionally include transmitting the sensor measurements to a remote computing system S140; generating a notification based on determining driver distraction S150; and, using the driver distraction determination in an application S160.

All or part of the method 100 is preferably performed in real- or near-real time (e.g., during the driving session, as new sensor measurements are being sampled, etc.), but can alternatively be performed asynchronously (e.g., after the driving session has ended, when a suitable network link for off-vehicle data transmission is available, etc.) or at any other suitable time. The method 100 is preferably performed for a plurality of drivers and a plurality of driving sessions, but can alternatively be performed for a single driver, a single driving session, or any suitable population of drivers or driving sessions. The method 100 is preferably repeated multiple times throughout a driving session, but can alternatively be performed once per driving session, performed in response to occurrence of a determination event (e.g., when a distraction factor value exceeds a threshold; when a near-collision event occurs; when the user initiates distraction determination; etc.), or be performed at any other suitable time or frequency.

The method 100 can be entirely or partially performed by a system on-board the vehicle (e.g., an onboard system). The system can be an auxiliary system retrofitted onto the vehicle, the vehicle itself, a user device, or be any other suitable system. The system can include sensors (e.g., optical sensors, audio sensors, stereocamera, stereomicrophone, inertial sensors, accelerometer, gyroscope, magnetometer, etc.), a processing system (e.g., CPU, GPU), outputs (e.g., speaker, vibration mechanism, etc.), a location system (e.g., GPS, cellular trilateration system, etc.), communication systems (e.g., long range connections, such as cellular or WiFi, short range connections, such as BLE or NFC, wired connections such as a vehicle data bus, etc.), a power system (e.g., a vehicle power plug, a battery, etc.), or any other suitable component. In one variation, the system includes an interior-facing camera (e.g., directed toward the vehicle interior, toward the driver's head volume), an exterior-facing camera (e.g., directed toward the horizon, toward the road, etc.), a set of audio sensors, a set of inertial sensors, a location system, and a mount configured to mount the system to the vehicle dash, windshield, rear view mirror, or any other suitable part of the vehicle. In another variation, the method 100 is performed by a system substantially as described in U.S. application Ser. No. 15/705,043, filed 14 Sep. 2017, which is hereby incorporated in its entirety herein by this reference. However, the method can be performed by any other suitable system. In one example, the relative locations and/or relative field of view relationship (e.g., x, y, z relationship; angular relationship; etc.) between the interior-facing camera and the exterior-facing camera are known and statically coupled, such that information extracted from the images sampled by the interior-facing camera (interior camera) can be spatially mapped to information extracted from the images sampled by the exterior-facing camera (exterior image). In a specific example, the driver's gaze direction determined from an interior image can be spatially mapped to physical regions in the vehicle ambient environment that appear in the exterior image. However, the spatial relationship between the sensors can be otherwise used.

Additionally or alternatively, all or parts of the method 100 can be performed by a remote computing system (e.g., a remote server), by a secondary system, or by any other suitable system. In one variation of split computing, sampling the sensor measurements associated with the distraction factors, processing the sensor measurements into distraction factor values, and identifying the distraction event based on the distraction factor values (e.g., the imminent, occurring, or previously occurred distraction event) can all be performed by the on-board system, while distraction event verification and application to other processes (e.g., post-processing into a distraction heat map, filtering driving routes for optimal routes, etc.) can be performed by the remote computing system. In this variation, the on-board system can transmit sensor measurements associated with the distraction event (e.g., sensor measurements recorded before, during, and/or after the distraction event), derivative information associated with the distraction event (e.g., derivative information generated from one or more sensor or other input types), distraction event parameter values (e.g., time, driver, location, severity, etc.), or any other suitable information to the remote computing system: immediately upon distraction determination (e.g., using the communication system), upon connection to a high-bandwidth connection (e.g., upon connection to a home or office WiFi system), or at any other suitable time. In a second variation, the sensor measurements can be transmitted in real- or near-real time to the remote computing system, wherein the remote computing system performs the remainder of the method 100. However, the method 100 can be otherwise performed by any other suitable set of systems.

The detected driver distraction (distraction event, distraction state) can be used in one or more applications. In a first application, the detected distraction event can be used to filter driving routes (traversal routes) out of a plurality of driving routes (e.g., traversal paths) being considered for optimal route planning, wherein the optimal route can be subsequently recommended to drivers, used to direct autonomous vehicles, or otherwise used. For example, a first route or route section associated with a distraction event (or a distraction score above a threshold level) can be removed from consideration, while a second route or route section with no associated distraction event (or a distraction event below a threshold level) can be retained for optimal route determination.

In a second application, the detected distraction event or score thereof can be used to dynamically adjust notification parameters. The notification can be a notification for an imminent collision event, a notification to alert the driver that they are distracted, or be any other suitable notification. The imminent collision event can be an anticipated vehicle collision with an object moving into or already within the vehicle's anticipated traversal path, or be any other suitable collision event. The imminent collision event can be determined from images recorded by the external cameras (e.g., using object detection, tracking, etc.), from vehicle sensors (e.g., proximity sensors, RF sensors, etc.), or otherwise detected. In one variation, the notification parameter values (e.g., volume, brightness, duration, etc.) can be proportionally increased as a function of the driver distraction score (e.g., calculated for the detection time of the imminent collision event). In a second variation, the notification type can be selected based on the driver distraction score (e.g., calculated for the imminent collision event detection time). For example, the driving wheel can be vibrated when the distraction score is below a threshold score, while the vehicle's audio system can be controlled to emit an audio notification when the distraction score rises above the threshold score. However, the notification parameters can be otherwise dynamically adjusted based on the distraction score.

In a third application, the detected distraction event or score thereof can be fed into a near-collision determination module that determines whether a near-collision event has occurred. In a fourth application, the distraction score can be used to determine whether the driver was the cause of a collision, or to determine the percentage of fault assigned to the driver. For example, if the driver was not distracted or had a distraction score below a threshold level during or within a time period preceding the collision, the driver can be assigned a lower fault percentage than if the driver was distracted or had a distraction score above a threshold level during or within the time period preceding the collision. The time period can be a constant duration or be variable depending on the collision type.

In a fifth application, the detected distraction event or score thereof can be stored in association with an identifier for the driver (e.g., in a driver profile). This driver profile can be used to determine driver-specific notifications, alerts, routes, or any other suitable information. In one variation, the method 100 can include identifying contexts associated with a higher frequency of distraction for a given driver (e.g., based on historic distraction patterns) and automatically determine a route that minimizes the probability of distraction (e.g., minimizes the number of encountered distraction-associated contexts) for the driver (e.g., identified using the method disclosed in U.S. application Ser. No. 15/642,094 filed 5 Jul. 2017, incorporated herein in its entirety; or any other suitable method). In a second variation, the method 100 can include preemptively notifying the driver when nearing locations historically associated with a distraction event for the driver. In a third variation, the method 100 can include providing coaching to a driver based on a historical distraction event data associated with the driver (e.g., providing feedback to the driver based on past behavior to prevent future distracted behavior, at such times as similar behavior patterns are determined via the method or at other suitable times). However, the driver profile can be otherwise suitably used. Furthermore, the detected distraction event or score thereof can be otherwise suitably used. In this and related applications, the score (e.g., distraction score) is preferably determined by a scoring module, but can be otherwise suitably determined.

The method 100 and/or Block(s) thereof are preferably implemented by one or more modules (e.g., distraction module, object classification module, object detection module, scoring module, face detection module, any other suitable computing modules, etc.) of a computing system. Each module of the plurality can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using end-to-end learning, using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each module can additionally or alternatively be a: probabilistic module, heuristic module, deterministic module, or be any other suitable module leveraging any other suitable computation method, machine learning method, or combination thereof.

Each module can be generated, validated, verified, reinforced, calibrated, or otherwise updated based on newly received, up-to-date measurements; past measurements recorded during the operating session; historic measurements recorded during past operating sessions; synthetic data; or be updated based on any other suitable data. For example, the distraction module and/or facial recognition module can be trained using a set of synthetic images, which can include a set of real images of driver faces that are overexposed, edited (e.g., to include shadows or lines that simulate shadows from the vehicle frame), warped (e.g., to simulate different camera positions or differences), and/or otherwise modified to simulate different imaging conditions. However, any suitable set of data can be used, such as the data generated using the method disclosed in U.S. application Ser. No. 15/641,982 filed 5 Jul. 2017, which is incorporated herein in its entirety by this reference, or any other suitable set of data. Each module can be run or updated: once; at a predetermined frequency; every time the method is performed; every time an unanticipated measurement value is received; or at any other suitable frequency. The set of modules can be run or updated concurrently with one or more other modules, serially, at varying frequencies, or at any other suitable time.

2. Benefits

Variants of the method 100 can confer various benefits and/or advantages.

First, variants of the method can enable potential collisions to be avoided, by alerting (e.g., notifying) a driver that he or she is distracted or is likely to become distracted based on driver behavior. For example, the method can include generating an audio alert when the gaze of the driver has drifted (e.g., beyond a threshold angular departure from the direction of travel of the vehicle for greater than a threshold amount of time), which can refocus the driver's attention on the road.

Second, variants of the method can enable a remote entity (e.g., a fleet manager) to simultaneously monitor the performance (e.g., the distraction levels, states, scores, etc.) of a plurality of drivers. For example, an onboard system installed in each of a fleet of vehicles can independently detect whether a driver is in a distracted state or an attentive state, and can transmit the state of the driver to a remote computing system associated with the remote entity.

Third, variants of the method can enable distributed computation for enhanced performance of the computing system and modules thereof. For example, the method can include detecting the distraction state of the driver using a computational module of an onboard system, and can transmit the results of the first distraction state detection (and/or underlying sensor data) to a remote computing system to confirm or refute the initial detection. Thus, in the aforementioned example, the onboard system can avoid false negative detections (e.g., the onboard system can implement a lower detection threshold for distraction and/or a less complex computational model) and respond rapidly to perceived driver distraction, while the remote computing system can avoid false positive detections that could result in negative repercussions for the driver (e.g., higher insurance premiums, loss of his or her job, etc.).

Fourth, variants of the method can enable context-based actions (e.g., notifications). For example, the sensor data can be fed into multiple analysis modules, wherein the output of one analysis module can function as a trigger event or as secondary validation for a different analysis module. Additionally or alternatively, the results of the multiple analysis modules can be fed into a downstream module (e.g., a scoring module, a notification module), wherein the downstream module can dynamically select action parameters (e.g., notification intensity, type, start time, end time, etc.) based on the modules' output values. In a specific example, an urgent notification can be quickly presented when a driver is both distracted and tailgating (e.g., outputs from the distraction module and tailgating module, respectively), and a warning notification can be presented only after sustained detected distraction when the driver is distracted and not tailgating. In other examples, notifications can be presented to the driver when a combination of a distraction event and any other relevant traffic situation (e.g., approaching a red or yellow traffic signal, approaching a stop sign, proximity to a pedestrian or vehicle, etc.) is detected. However, the analysis modules can be otherwise used.

However, variants of the method 100 can additionally or alternatively confer any suitable benefits and/or advantages.

3. Method.

The method 100 includes Block S110, which includes: sampling sensor measurements. Sampling the sensor measurements functions to sample signals indicative of driver distraction for a given time point or time period. The sensor measurements are preferably sampled (e.g., recorded) during a driving session, but can alternatively be performed immediately before or after a driving session, substantially before or after a driving session, across multiple driving sessions, or at any other suitable time. The sensor measurements can be recorded at a predetermined frequency (e.g., 2-5 Hz, 10 Hz, 100 Hz, etc.), be recorded in response to occurrence of a recordation event (e.g., when the proximity sensors detect proximal objects, when the vehicle velocity exceeds a threshold velocity, etc.), or be recorded at any other suitable time, in response to and/or based on any suitable trigger or event. The sensor measurements are preferably recorded by the on-board system, but can alternatively be recorded by any other suitable set of sensors.

Figure 2:
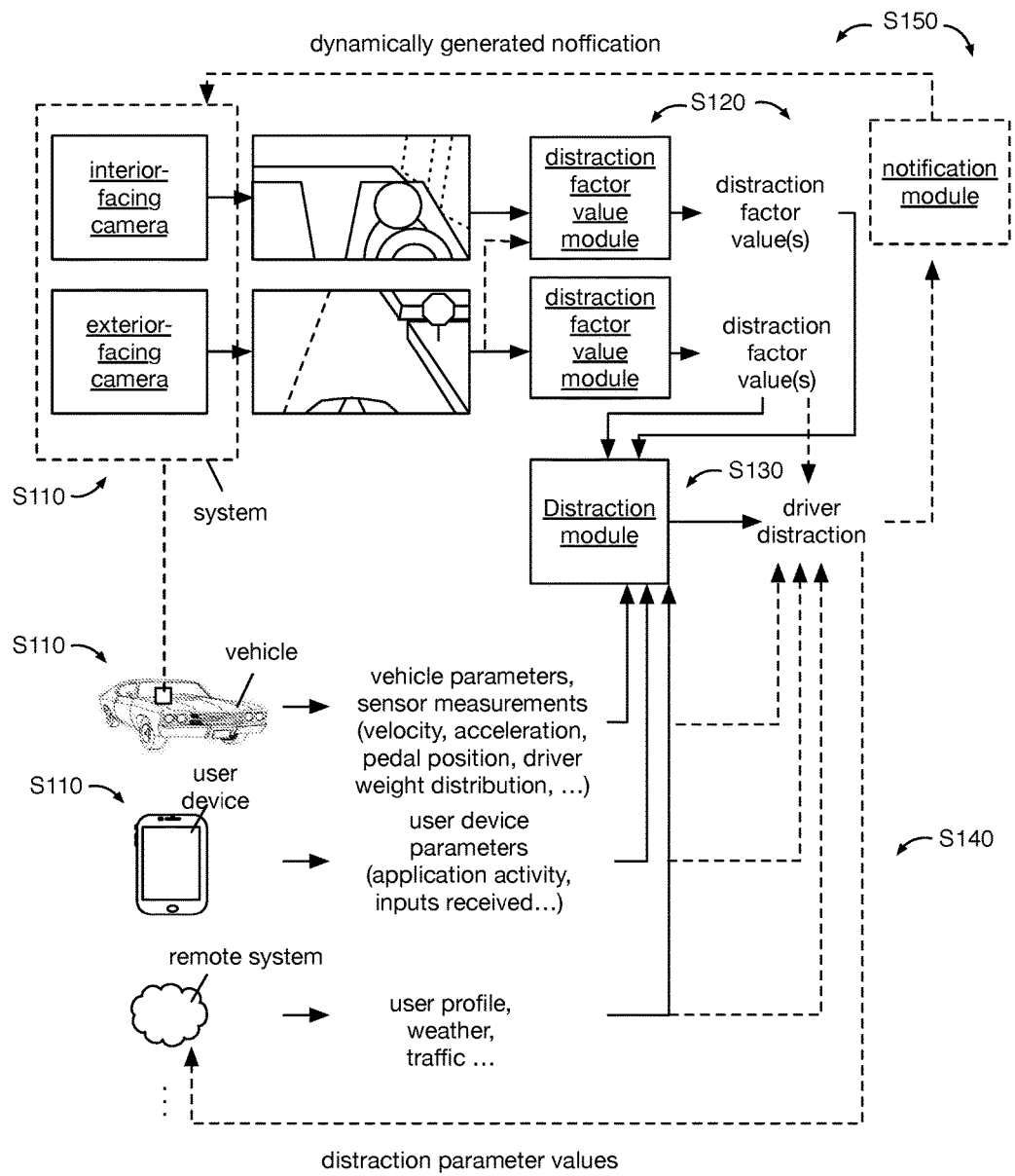
FIG. 2 is a schematic representation of an example system for driver distraction determination.

In a first variation, the sensor measurements include an image or video (e.g., set of images) of the cabin interior, which can be sampled by the inward-facing camera directed toward the driver's side head volume or otherwise sampled (example shown in FIG. 2). For example, Block S110 can include sampling sensor measurements at an onboard system of the vehicle, wherein the sensor measurements include an image of the driver (e.g., S110a, S110'). The camera's field of view preferably includes all or a portion of the driver's head, and can optionally include all or a portion of the passenger-side volume (e.g., the passenger's body or head), all or a portion of the rear seats, all or a portion of the rear window, the driver's side window(s), the passenger side window(s), or include any other suitable portion of the vehicle interior. The image(s) can be used to optically identify and/or track the driver's head position, head movement, eye position (e.g., gaze direction), eye movement, parameters thereof (e.g., duration, angle, etc.), or determine any other suitable distraction factor value. The image(s) can additionally be used to determine the driving context, such as whether there is a passenger in the vehicle or where the passenger is located, the environment around the vehicle visible through the vehicle windows, and/or any other suitable context derivable from the image(s). The image(s) can additionally be used to verify or validate other distraction factor values. For example, driver interaction with a user device (e.g., phone) can be verified when the user device is present in the concurrently recorded image. The image can be a visual spectrum image, hyperspectral image, IR image, or be sampled at any other suitable wavelength. The image can be recorded using ambient light, light emitted by a light emitter (e.g., from an LED flash, etc.), or using any other suitable light source. The image can be a stereoimage (e.g., recorded by a stereocamera), a single image, or be any other suitable image.

In a second variation, the sensor measurements include cabin audio (e.g., vehicle interior noise), which can be sampled by the audio sensor arranged proximal the driver's volume (e.g., integrated with the onboard system, part of a user device associated with the driver, etc.) or otherwise sampled. The cabin audio can be used to infer the driver head position, the driving context (e.g., whether the driver is calm, whether there is a child in the vehicle, etc.), or be otherwise used. The cabin audio preferably includes driver audio, and can optionally include passenger-side audio, rear-seat audio, vehicle audio (e.g., generated by the vehicle), road noise, radio audio, notification audio, or any other suitable audio stream. The cabin audio can be a single stream (e.g., recorded by a single audio sensor), multiple streams (e.g., recorded by multiple collocated or distal audio sensors, wherein the cabin audio is recorded in stereo, etc.), or include any suitable number of audio streams.

In a third variation, the sensor measurements include user device operation parameters, which can be determined by the user device or otherwise determined (example shown in FIG. 2). User device operation parameters can include the user device's: processing load (e.g., as determined from an activity monitor, the CPU load, the GPU load, etc.), processing load changes, power consumption, touch input operation, sensor measurements, or any other suitable set of operation parameters. User device sensor measurements can include user device kinematics, pressure, temperature, ambient light obstruction, or any other suitable parameter measurement indicative of driver interaction with the user device. The user device operation parameters can be determined by one or more clients (e.g., applications, SDKs on multiple applications, etc.) running on the user device, or be otherwise determined. In one example of the variation, processing load increases can be indicative of user interaction with the user device. In a second example of the variation, touch input operation can be indicative of user entering data into the user device. In a third example of the variation, user device vibration can be indicative of the user device being knocked by the user. In a fourth example, user device translation can be indicative of the user device being lifted or picked up by the user. In a fifth example, an increase in the sampled user device ambient pressure or temperature can be indicative of the user device being held. However, any other suitable user device parameter can be monitored for user interaction with the user device.

In a fourth variation, the sensor measurements include vehicle sensor data, which can be determined by the vehicle or otherwise determined (example shown in FIG. 2). The vehicle sensor data can be received from the vehicle through the vehicle data bus, wirelessly communicated from the vehicle, or otherwise received from the vehicle. The vehicle sensor data can include: control panel signals (e.g., whether the radio is being changed, whether the user interface is being used, etc.), steering wheel signals (e.g., number of touches, high pressure regions, high temperature regions, etc. on the steering wheel), seat sensor signals (e.g., driver's weight distribution or change over time, etc.), or any other suitable set of measurements. However, any other suitable set of sensor measurements can be sampled.

In a fifth variation, the sensor measurements include an image or video (e.g., set of images) of the vehicle exterior, which can be sampled by the outward-facing camera directed toward the front of the vehicle (e.g., through the front windshield) or otherwise sampled (e.g., examples as shown in FIG. 2). The camera's field of view preferably includes all or a portion of the roadway oriented toward the front the vehicle (e.g., the foreground toward the front of the vehicle, the lane in which the vehicle is moving, the adjacent lane or lanes, etc.), and can optionally include the region(s) to the sides of the vehicle (e.g., the driver's side, the passenger's side), to the rear of the vehicle, above the vehicle (e.g., through a sunroof and/or moon-roof), or include any other suitable portion of the environment outside the vehicle. The image(s) can be used to optically identify and/or track the vehicle's position within the environment (e.g., localize the vehicle), position within a lane, position relative to other objects (e.g., vehicles, pedestrians, etc.), or determine any other suitable parameter value. The image(s) can additionally be used to determine the driving context, such as whether there is a second vehicle in front of or beside the vehicle in which the sensor is emplaced. The image(s) can additionally be used to determine, verify, and/or validate other distraction factor values. For example, driver attentiveness can be measured based on an amount and/or frequency of lateral drifting within a lane of the roadway. Drifting within a lane can be based on vehicle path extraction (e.g., extraction of the vehicle trajectory from the image or images) and comparison to lane markers extracted from images of the road. The image can be a visual spectrum image, hyperspectral image, IR image, or be sampled at any other suitable wavelength. The image can be recorded using ambient light, light emitted by a light emitter (e.g., from an LED flash, etc.), or using any other suitable light source. The image can be a stereoimage (e.g., recorded by a stereocamera), a single image, or be any other suitable image.

In a sixth variation, the sensor measurements include a kinematic signal. The kinematic signal is preferably indicative of a kinematic variable of the vehicle (e.g., acceleration, velocity, position, jerk, etc.), but can additionally or alternatively be indicative of any suitable motion variable associated with the vehicle and/or vehicle occupants (e.g., the driver, a passenger, etc.). The kinematic signal is preferably collected by a kinematic measurement mechanism (e.g., inertial measurement unit) of the onboard system, but can additionally or alternatively be collected by any other suitable component. In a first example, the sensor measurements include an accelerometer output of an inertial measurement unit of the onboard system. However, the sensor measurements can otherwise include any suitable kinematic signal, vehicle information (e.g., steering wheel position, pedal position), indicator, or other information.

The method 100 includes Block S120, which includes: determining distraction factor values based on the sensor measurements. Determining the distraction factor values functions to characterize the driver's attention, distraction level, or other suitable indicator of driver attention to the set of tasks associated with driving a vehicle. Distraction factors for which values can be determined can include: driver gaze direction, driver eye motion, driver head direction, driver head motion, driver body position, vehicle cabin noise, user device interactions (e.g., phone interactions, vehicle control panel interactions, or any other suitable factor indicative of imminent, instantaneous, or prior driver distraction. One or more distraction factor values can be determined concurrently or asynchronously and used for distraction event detection.

The distraction factor values are preferably determined based on the sensor measurements, but can additionally or alternatively be retrieved, received (e.g., from a preprocessing system or database), or otherwise determined. The distraction factor values can be determined from a single sensor measurement type, determined from multiple sensor measurement types (e.g., using sensor synthesis), or otherwise determined. Additionally or alternatively, the determined factor values can be verified using a second sensor measurement type.

The distraction factor values are preferably implicitly determined within a model of driver distraction, but can additionally or alternatively be explicitly determined and/or otherwise computed. In a first example, Block S120 is implemented at least in part as a learning module trained in an "end-to-end" manner, wherein inputs are provided to the module and the output is labeled as either positive (e.g., distracted) or negative (e.g., not distracted), but the features (e.g., distraction factor values) of the model implemented by the learning module are not pre-specified. However, Block S120 can be otherwise suitable implemented as a non-learning module, and/or as a learning module trained in any other suitable manner.

Each determined distraction factor value can be associated with the recordation time of the underlying sensor measurement, the vehicle location associated with the recordation time (e.g., determined using the system location system, vehicle location system, etc.), the driver associated with the driving session and/or recordation time (e.g., as determined from driver biometrics, the driver's user device, etc.), or with any other suitable concurrent parameter. However, the distraction factor values can be associated with any other suitable time, location, driver, or information.

The distraction factor value can be determined (e.g., by a distraction detection module, of which an example is shown in FIG. 2) using equations, regression, classification, neural networks (e.g., convolutional neural networks, deep neural networks), heuristics, selection (e.g., from a library, graph, or chart), instance-based methods (e.g., nearest neighbor), regularization methods (e.g., ridge regression), decision trees, Baysean methods, kernel methods, probability, deterministics, a combination of the above, or any other suitable method. The distraction factor value can be a binary state (e.g., distracted and not distracted), a score (e.g., a distraction score, etc.), a severity (e.g., a likelihood of a distraction state or event to lead to material loss, a risk factor associated with a distracted state, etc.) or be any other suitable measure of a driver's distraction level.

In a specific example, Block S120 can include receiving the sensor measurement (e.g., an image) at a face detection module of the onboard system. This example can include generating, at the face detection module, an output, wherein the output is indicative of the presence of a face in the image (e.g., S120a, S120'). The output can be used as a check (e.g., one of a plurality of checks) on an output of the driver distraction module to determine if the driver distraction module has erroneously labeled a distraction event and/or distraction state. However, the first output indicative of the presence of a face in the image can be otherwise suitably used (e.g., to identify a driver).

In another specific example, Block S120 can include receiving the sensor measurement (e.g., an image, a sequence of images, etc.) at a driver distraction module of the onboard system. This example can include generating an output, at the driver distraction module, indicative of a distracted state (e.g., S120b, S120"). The output of the driver distraction module is preferably generated in parallel to the output of the face detection module (e.g., in real time, in near real time, simultaneously, contemporaneously, within a microsecond interval, within a second interval, etc.), but can additionally or alternatively be generated sequentially (e.g., before or after the output of the face detection module) and/or having any suitable temporal relationship to any suitable generated output of other suitable modules. In further alternatives, the driver distraction module can operate independently of a face detection module, which can be omitted in some variations.

In a first variation, determining the distraction factor value can include determining the parameters of the driver's gaze, such as gaze direction, gaze duration, gaze angle (e.g., relative to a reference point), rate of change of gaze direction, or any other suitable gaze parameter. This can include identifying the driver's corneal reflectance, pupil, retinal patterns, or other eye parameter in the sampled images or video frames (e.g., the image segment associated with the driver's volume), and determining the driver's gaze direction using gaze estimation, head pose determination, or any other suitable technique. The gaze direction can optionally be classified as one of a set of predetermined directions (e.g., forward, right side, left side, rearward, etc.) or otherwise characterized. Additionally or alternatively, the number, frequency, duration, or other parameter of the gazes can be determined for each head pose, time duration, or from any other set of images.

In a second variation, determining the distraction factor values can include determining the driver's head motion. This can include: using object recognition to recognize the driver's head within the image, tracking the head (e.g., recognized object) motion through a series of images (e.g., using object tracking), determining parameters of the head motion (e.g., turn direction, motion duration, etc.). This variant can optionally include determining the current or anticipated head pose based on the head motion parameters.

In a third variation, determining the distraction factor values can include determining the driver's head pose. This can include: recognizing the driver's head within the image, retrieving a reference image of the driver's head while the driver was looking forward, and determining the driver's head pose based on differences between the driver's head in the new image and the driver's head in the reference image. In one embodiment, this can include: recognizing the driver's head within the image using object recognition, determining the head's pose using head pose determination methods (e.g., iterative closest curve matching), and comparing the determined head pose to the head pose in the reference image. In a second embodiment, this can include: recognizing the driver's head within the current image using object recognition, identifying one or more reference points on the driver's head (e.g., eyes, nose, moles, freckles, etc.), identifying the corresponding reference points on the reference image, and determining the driver's current head pose based on the difference between the reference points' positions in the current image and the reference image. The reference image (or reference head pose) can be a prerecorded image with the driver in the vehicle (e.g., where the driver is instructed to gaze forward during image recordation), a prerecorded image of the driver (e.g., driver's license standard image) superimposed within the driver head volume, an image composited from multiple images recorded over one or more driving sessions (e.g., the average head pose), or be any other suitable reference image. This variation can optionally include recognizing objects within the vehicle (e.g., children, passengers, etc.), determining the object's location within the vehicle, and evaluating the driver's interaction with the object. For example, a driver's head turn can be classified as a blind spot check with a low distraction score when no passengers are in the vehicle, and but be classified as a child interaction with a high distraction score when a child appears within the camera frame. However, the head pose can be otherwise determined.

In a fourth variation, determining the distraction factor values can include determining the driver's head pose based on the cabin acoustics. In one embodiment, the head pose can be determined from a single acoustic frame, recorded by a set of stereo microphones. In this embodiment, the method 100 can include: extracting the acoustic signal associated with the driver's voice from the first and second signal from the first and second microphone, respectively (e.g., using pattern matching, noise reduction, etc.); comparing the magnitude or amplitude of the driver's voice between the first and second signals; and determining the driver's head pose as turned toward the microphone that measured the louder voice. In a second embodiment, the head motion can be determined from a set of acoustic frames recorded by a set of stereo microphones. In one example, a decrease in acoustic intensity sampled by a first microphone paired with an increase in acoustic intensity sampled by a second microphone can be interpreted as a head turn toward the second microphone (e.g., using pattern matching, etc.).

Additionally or alternatively, the cabin acoustics can be used to determine driving context. In one example, the cabin acoustics can be used to determine whether a passenger is present in the vehicle (e.g., based on detection of a second voice), used to classify the passenger (e.g., as a child, adult, potential distraction, etc.), used to determine the passenger's location, or otherwise used.

In a fifth variation, determining the distraction factor values can include determining the degree of user interaction (e.g., frequency, duration, intensity, etc.) with a user device. In one example, the method 100 can include receiving a user input at the user device (e.g., touch input, haptic input, etc.) and determining that the user has interacted with the user device. In a second example, the method 100 can include determining parameters of the user input (e.g., frequency of inputs; input types, such as targeted inputs or noisy inputs; frequency of application switching; types of applications interacted with; etc.) and determining the degree of user interaction based on the user input parameters. In a specific example, targeted user inputs (e.g., precise key entries), high frequencies of user inputs, and messaging applications can be associated with a high degree of user interaction, while noisy user inputs, low input frequencies, and map applications can be associated with a low degree of user interaction. In a third example, the method 100 can include identifying entire or portions of driver body parts (e.g., hands, torso) in the sampled signals (e.g., image(s)), characterizing the body part (e.g., size, position, pose, context, action, etc.), and determining the distraction factor values based on the characterization. For example, a high distraction values can be associated with sideways torso orientation (e.g., instead of forward-facing), less than a threshold proportion of hands detected on the steering wheel, or with any other suitable body part characterization.

Determining the degree of user interaction with the device can optionally include determining the identity of the user interacting with the device. In one variation, the user identity can be determined using the user's biometrics (e.g., fingerprint), as measured by the user device. In a second variation, the user identity can be determined using the user device's location within the vehicle during the interaction session. In one example, the user device's location within the vehicle can be determined from one or more short-range connections established between the user device and one or more secondary endpoint(s) with known locations (e.g., beacons attached to the A-pillars, beacon attached proximal the driver volume). In a specific example, the user device location can be determined based on the strength of the connection; for example, the interaction session can be classified as a passenger interaction session (instead of a driver interaction session) if the user device is weakly connected to a driver-side beacon, but strongly connected to a passenger-side beacon. However, the user identity can be otherwise determined. Determining the degree of user interaction with the device can optionally include filtering vehicle-induced device motion from user-induced device motion. The motion can be filtered using: concurrently measured temperature (e.g., whether the motion is associated with an increase in ambient temperature), pattern matching (e.g., using patterns previously associated with vehicle motion, given the instantaneous measured vehicle kinematics), classification, or otherwise determined. However, vehicle motion can be otherwise filtered from the user device motion.

In another example, the distraction factor values can be determined based on the amount of driver's gaze overlap with an external object or based on the driver's anticipated gaze overlap with the anticipated position of the external object relative to the vehicle. In a specific example, the method 100 can include identifying external objects (e.g., from external images), assigning a collision risk to each identified object (e.g., based on the vehicle's kinematics, planned route, etc.), determining the driver's gaze direction (e.g., from images sampled by the internal-facing camera), optionally determining the driver's field of view, and determining a distraction score based on the amount of driver's gaze or field of view overlap with identified objects having collision risks above a threshold risk value. However, the external signals can be otherwise used.

In yet another example, the distraction factor values can be determined based on the rate at which the object of a driver's gaze changes. For example, the distraction score can be increased based on the rate falling below a threshold level, which can be indicative that the driver is not adequately scanning the roadway while operating the vehicle and is instead gazing at a fixed point (e.g., and may be lost in thought).

However, the distraction factor values can be otherwise determined.

The method 100 can optionally include determining the context of the distraction state, which functions to enable the severity of the distraction state to be characterized. In variations, determining the context includes determining scaling factor values, which can function to fine-tune the severity of the determined distraction (e.g., determined distraction score). Additionally or alternatively, the scaling factor values can be used as inputs into the distraction determination module or be otherwise used.

In a first variation, the scaling factor values can be determined based on the vehicle operation parameters (example shown in FIG. 2). Vehicle operation parameters can include: vehicle kinematics (e.g., velocity, acceleration), vehicle location, vehicle notifications, vehicle driving instrument position (e.g., brake position, accelerator position, steering wheel position, wheel position, etc.), or any other suitable operation parameter. The vehicle operation parameters can be determined by the vehicle, the system, the user device, or any other suitable system. In one embodiment, the scaling factor values can vary with a collision probability, as determined based on the vehicle operation parameters. However, the scaling factor values can be otherwise determined. In one example, the distraction score can be scaled as a function of the vehicle kinematics magnitude (e.g., be higher when the vehicle is moving faster, be lower when the vehicle is stopped). In a second example, a different score threshold (e.g., used to determine whether the distraction event is recorded, to determine whether a notification should be presented, etc.) can be selected based on the vehicle kinematics magnitude (e.g., the velocity of the vehicle). In a third example, a different scaling value (e.g., weight) can be selected based on the location (e.g., geographic location) associated with the distraction event. The scaling value assigned to the location can be specific to the driver (e.g., determined based on the driver profile), specific to the driver demographic, universal, or otherwise shared. The scaling value assigned to the location can be static, dynamic (e.g., vary with traffic proximal the location, traffic upstream from the location, etc.), or otherwise determined.

In a second variation, the scaling factor values can be determined based on signals indicative of the driving environment (example shown in FIG. 2). These signals can include external signals (e.g., of the vehicle ambient environment), internal signals (e.g., of the vehicle interior environment), or any other suitable set of signals.

External signals can include traffic parameters (e.g., traffic density, traffic flow rate, etc.), road type (e.g., highway or urban), traffic signals (e.g., road signs, stop signs, stop lights, etc.), objects or obstructions (e.g., in the anticipated traversal path), weather conditions (e.g., based on a weather forecast or determined in near-real time for the ambient environment), adjacent drivers' profiles, adjacent drivers' distraction levels, or any other suitable external parameter associated with driving risk. Traffic parameters can be crowdsourced (e.g., manually generated by a plurality of users inputting traffic information; automatically generated from a plurality of systems each with an external camera, etc.), automatically determined (e.g., using the images sampled by the external-facing camera), determined from the vehicle's location and historic traffic patterns for the location and the recurrent time period, or otherwise determined. The road type can be determined based on a municipal map and the vehicle's location, determined based on the vehicle's velocity (e.g., classified as a highway when the velocity is over 60 mph), determined based on features or objects extracted from the external images, or otherwise determined.

In one example, the distraction score can be scaled higher (e.g., the scaling factors can be larger) when the driver is distracted while in heavy traffic. In a second example, the distraction score can be scaled lower when a stop sign or red light appears in the external image (e.g., image sampled by the external-facing camera), and scaled higher when no traffic sign or a green light appears in the external image. In a third example, the distraction score can be scaled higher (e.g., increased in weight) when a stop sign or red light appears in an image of the external environment and the vehicle velocity exceeds a threshold value (e.g., 0 mph, 5 mph) at a predetermined location relative to the traffic signal (e.g., 0 ft. away, 5 ft. away, etc.), indicative that the vehicle is entering a scenario requiring enhanced attention. However, the distraction score can additionally or alternatively be scaled higher or lower based on any suitable determination.

Internal signals can include: passenger presence, passenger type, passenger activity (e.g., all of which can be determined from the sensor measurements or otherwise determined), vehicle kinematics (e.g., rapid starting or stopping), recurrent time (e.g., time of day, month, year), driver calendar, passenger calendar, or any other suitable internal parameter associated with driving risk. The internal signals can be received from vehicle sensors, system sensors, user device sensors, secondary user accounts associated with the user account (e.g., a calendar associated with the user account through OAuth), or otherwise determined.

In a third variation, the scaling factor values can be determined based on vehicle parameters (example shown in FIG. 2). Vehicle parameters can include the vehicle autonomy type (e.g., autonomous, semi-autonomous, manual, etc.), the vehicle class (e.g., sedan, truck, etc.), vehicle ride height, vehicle braking power, vehicle horsepower, vehicle torque, or any other suitable vehicle parameter. The vehicle parameters can be received from the user (e.g., entered by the user), automatically determined from a database, automatically determined from the vehicle electronic control unit, automatically determined from the sensor measurements (e.g., from the proportion of the road seen in the external image, by matching vehicle interiors to the vehicle interior from the internal image), or otherwise determined. In one example, the distraction score can be heavily discounted when the vehicle is a fully-autonomous vehicle, and scaled up when the vehicle is a level 0 or level 1 SAE automated vehicle class. In a second example, the distraction threshold used for notification presentation, distraction score storage, or for other applications can be selected based on the vehicle parameter values. For example, a first threshold can be selected for a level-0 or level-1 vehicle, a second threshold higher than the first can be selected for a semi-autonomous vehicle, and a third threshold higher than the second threshold can be selected for an autonomous vehicle. The second threshold can be closer to the first threshold than to the third threshold, but the thresholds can be otherwise distributed. However, the factor values and/or scaling values can be otherwise determined.

The method 100 includes Block S130, which includes: determining that the driver of the vehicle is characterized by the distracted state (e.g., determining driver distraction) based on the factor values. Determining driver distraction based on distraction factor values functions to determine a measure of driver distraction for a given time period. The driver distraction can be determined (e.g., by a driver distraction module, example shown in FIG. 2) using equations, regression, classification, neural networks (e.g., convolutional neural networks, deep neural networks), heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, a combination of the above, or any other suitable method. The driver distraction can be a binary classification or binary score (e.g., distracted or not), a score (e.g., continuous or discontinuous; consistent or inconsistent with a uniform distraction scale; etc.), a classification (e.g., high, medium, low), or be any other suitable measure of distraction. The driver distraction can be determined at a predetermined frequency (e.g., every 5 seconds, continuously, etc.), in response to occurrence of a determination event (e.g., in response to obstacle identification in the vehicle path, in response to the driver's gaze being directed outside of a predetermined angular range, etc.), at a frequency selected based on available computing resources, or determined at any other suitable time.

Figure 4:
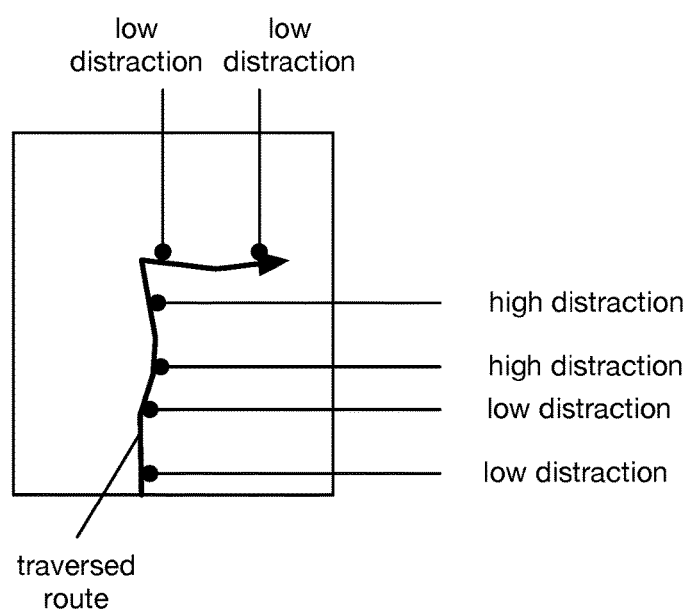
FIG. 4 is a schematic representation of an example route associated with a plurality of determined driver distraction scores for each of a plurality of locations traversed by the vehicle along the route, as determined for a driving session.

The driver distraction can be associated with a time or time period, a driver, a location, a driving context, route (e.g., as shown by example in FIG. 4), or any other suitable parameter value. The parameter values associated with driver distraction are preferably extracted from the parameter values associated with the driver distraction factor values used to determine the driver distraction, but can be any other suitable parameter value. For example, the time associated with the determined driver distraction is preferably the sampling time for the underlying data, not the driver distraction determination time. However, the time associated with the determined driver distraction can be the driver distraction determination time or be any other suitable time.

The driver distraction is preferably determined based on distraction factor values, but can be determined based on any other suitable information. The distraction factor values used to determine the driver distraction are preferably sampled within a predetermined time period (e.g., within 2 s of a reference time, wherein the reference time can be an image sampling time, a location sampling time, a randomly selected time, or be any other suitable time), but can alternatively be otherwise related. The driver is preferably deemed distracted (e.g., characterized by a distracted state) after a threshold number of image frames produce distraction factor values indicative of distraction, but can alternatively be deemed distracted after the values from a single frame are indicative of distraction, when the values satisfy a predetermined condition (e.g., surpass a threshold value), or otherwise determined. The threshold number of image frames can be predetermined, dynamically determined (e.g., based on other modules' output values, such as the external obstacle proximity, facial detection, vehicle kinematics, etc.), or otherwise determined. For example, the threshold number of frames can decrease with decreased leading vehicle separation and/or increased vehicle velocity. The time series of image frames can be contiguous or noncontiguous (e.g., the frames associated with a distracted state can be separated by frames associated with undistracted states), wherein the number or frequency of undistracted frames can be predetermined, dynamically adjusted based on context (e.g., other modules' output values), or otherwise determined.

In a first example, the driver distraction module can determine a first driver distraction score when the driver is gazing forward (e.g., as determined from the internal image), and determine a second driver distraction score higher than the first score when the driver is gazing downward or to the side. The driver distraction module can further determine a third driver distraction score higher than the second score when the driver is gazing toward the side and a noisy child is in the backseat, or when the driver is gazing away from or has a field of view non-overlapping with an obstruction detected in the vehicle path (e.g., determined from vehicle proximity sensors, the external image, etc.). However, the driver distraction module can determine any other suitable driver distraction score given any other suitable set of inputs.

In a second example, the driver distraction module can determine that the driver of the vehicle is characterized by the distracted state based on checking the result against a face detection module output (e.g., contemporaneously generated, asynchronously generated, etc.). In this example, Block S130 can include determining that the driver of the vehicle is characterized by a distracted state based on a combination of the output of the driver distraction module and the output of the face detection module (e.g., S130a, S130'). In this example, the driver distraction module determines whether or not the input data (e.g., image data) is indicative of driver distraction or not, and the face detection module determines whether the input data includes a face or not. For this example, in cases wherein a face is not detected but the driver distraction module determines that the driver is distracted, the output of the driver distraction module is presumed to be a false positive.

Block S130 of the method 100 can include determining a driver score, which can be distinct from a distraction score (e.g., S130c). The driver score is preferably a cumulative score based on a history of distraction scores, determined and recorded during prior driving sessions and a current driving session. An individual driver preferably has a single driver score that is associated with the driver, but can additionally or alternatively be associated with multiple driver scores. The driver score can be utilized in various Blocks of the method 100 in a similar manner to other scores (e.g., distraction scores) as described above, but can be otherwise suitably utilized. The driver score is preferably determined, at least in part, by the scoring module (e.g., as in S130c, in conjunction with a database including a time history of distraction scores associated with the driver, etc.).

Block S130 can, in variations, be partially or entirely implemented at a remote computing system. In a first example, Block S130 can include checking the result of a first distraction determination at a second driver distraction module implemented at the remote computing system, by providing the sensor measurements to the remote computing system. In this example, Block S130 includes generating, at a driver distraction module of the remote computing system, an output indicative that the driver is characterized by the distracted state, based on the sensor measurements (e.g., S130b). In this and other examples, the onboard driver distraction module can be configured to be computationally faster but less accurate than a remote driver distraction module (e.g., the onboard system can be implemented as a neural network having fewer neurons than the remote system), and the remote driver distraction module can be used to correct false positives generated by the onboard driver distraction module.

Block S130 can include determining a context of the distracted state (e.g., S130"). The context can be determined based on sensor measurements as described above, or otherwise suitably determined. Block S130 can further include determining a score (e.g., as described above), based on the context of the distracted state (e.g., S130'"). For example, determining the context of the distracted state can include determining that the traffic level is sparse, and the sparsity of the traffic can be used to weight the score (e.g., reduce the severity of the distraction level due to the low risk of vehicle or personal loss). However, the context can additionally or alternatively be otherwise suitably determined.

Determining the driver distraction can optionally include selecting a distraction model to use for driver distraction determination. This can be useful when a plurality of distraction models are available for driver distraction determination. In one variation, the distraction model can be selected based on the distraction factor values. In one example, the distraction model can be selected based on the distraction factor value for a limited subset of distraction factors, such as the driver's gaze direction or the current vehicle location. In a specific example, a first distraction model (e.g., a correlation model) can be selected when the driver's gaze is directed forward, and a second distraction model (e.g., a convolutional neural network or other more complex model) can be selected when the driver's gaze is directed backward or to the side. A more complex model can be selected in the latter instance to handle the increased complexities associated with the underlying cause(s) of the turned head. However, any other suitable model can be selected. In a second specific example, a first distraction model (e.g., a correlation model) can be selected when there are children in the vehicle, and a second distraction model (e.g., a convolutional neural network or other more complex model) can be selected when there are no children in the vehicle.

In a second example, the distraction model can be selected based on the numerosity of distraction factors concurrently exceeding their respective thresholds. In a specific example, a first distraction model (e.g., an equation) can be selected when no distraction factors exceed their thresholds (e.g., the driver's gaze is directed forward, there are no distractions within the vehicle, there are no obstructions in the vehicle path, etc.), a second model selected when a subset of the distraction factors exceed their thresholds (e.g., the driver's gaze is directed forward and there are no distractions within the vehicle, but there are obstructions in the vehicle path), and a third model selected when a different number of distraction factors exceed their thresholds (e.g., the driver's gaze is directed backward, there are distractions within the vehicle, and there are obstructions in the vehicle path). However, the distraction model can be otherwise selected.

The method 100 can optionally include updating the distraction models. The distraction models can be updated automatically, manually, or otherwise updated. The distraction models can be updated periodically (e.g., at a predetermined frequency), in response to occurrence of an update event (e.g., in response to the determined distraction score differing beyond a threshold difference from an actual distraction score), or at any other suitable time. Updating the distraction model can include: retraining the model using labeled training data or otherwise updating the distraction model. The training data can be automatically generated, manually generated, or otherwise determined.

Figure 3:
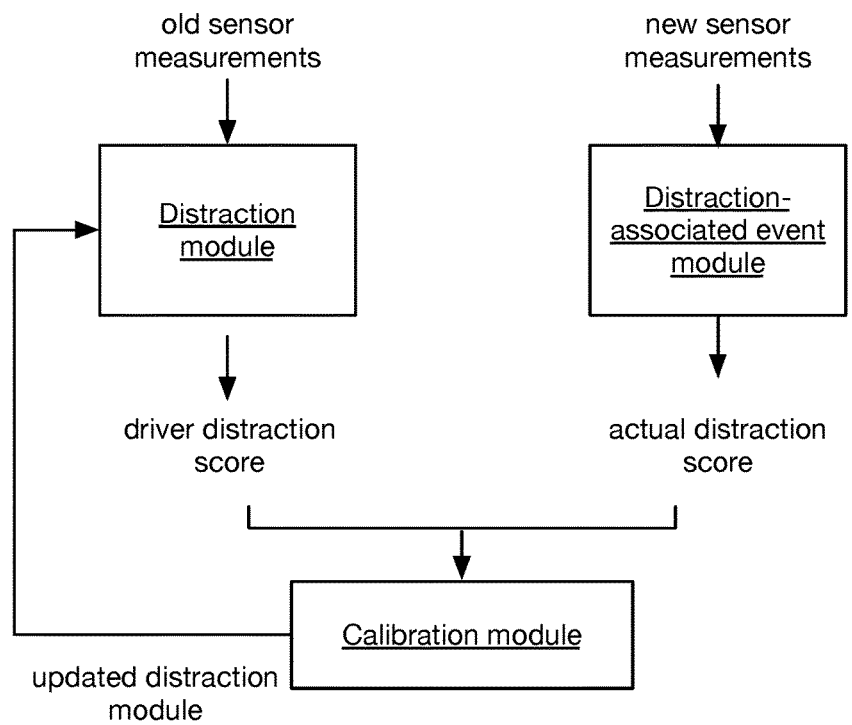
FIG. 3 is a schematic representation of an example of determination module updating.

As shown in FIG. 3, in a first variation, the method 100 can include determining a driver distraction score using a distraction module based on the sensor measurements sampled during a first time period, identifying a distraction-associated event (e.g., a collision, a near-collision, vehicle swerving, sudden braking, etc.) based on subsequent sensor measurements sampled during a second time period after the first time period (e.g., within a predetermined duration of the first time period), determining an actual distraction score based on the distraction-associated event, tagging the sensor measurements sampled during a first time period with the actual distraction score, and calibrating or retraining the distraction module until the determined driver distraction score substantially matches the actual distraction score. However, the distraction module or model can be otherwise updated.

The method 100 can optionally include transmitting the sensor measurements to a remote computing system S140. Block S140 functions to provide the sensor measurements to the remote computing system, where sensor measurements can be aggregated and/or acted upon by additional or alternative modules to those available at the onboard system. Block S140 is preferably performed asynchronously with collection of the sensor measurements, and in variations can be performed in response to the connection of the onboard system to a network data link having a predetermined characteristic (e.g., capacity, uplink speed, bandwidth, connection quality, etc.), in response to determination of a distraction score above a threshold distraction score value, or in response to any other suitable event. In an example, Block S140 can include transmitting the sensor measurements to a remote computing system in response to determining that the driver of the vehicle is characterized by the distracted state (e.g., S140a). However, Block S140 can additionally or alternatively be performed in real- or near real-time, substantially real time, simultaneously, contemporaneously, or with any other suitable temporal characteristics relative to sensor measurement.

The method 100 can optionally include generating a notification based on determining driver distraction S150. Block S150 functions to notify an entity (e.g., the driver, a remote fleet manager, a passenger) that the driver has been determined to be distracted. The notification can have any suitable format, including a textual format, an audio format, a video format (e.g., a video clip recording during over a time period at which the distraction state is determined), or have any other suitable format. Block S150 is preferably performed substantially immediately upon determination of driver distraction and/or a score or other characterization thereof, but can additionally or alternatively be performed asynchronously, in response to a trigger event (e.g., connection to a network link having a suitable characteristic), and/or with any other suitable temporal relationship.

In an example, Block S150 can include notifying the driver, at an output of the onboard system of the vehicle and in substantially real-time, based on the distracted state determined in Block S130, the context of the distracted state, and the score of the distracted state (e.g., S150'). In another example, Block S150 can include notifying a fleet manager, at an interface of the remote computing system (e.g., a local PC terminal, a user device associated with the fleet manager and communicatively coupled to the remote computing system, etc., that the driver score of a driver has fallen below a threshold as a result of consecutive determinations of a distracted state within a predetermined period of time (e.g., a day, five minutes, etc.) in response to updating the driver score (e.g., in real time, asynchronously, etc.). However, Block S150 can additionally or alternatively include generating a notification in any suitable manner, and transmitting and/or rendering the notification to any suitable entity in any suitable manner.

Figure 5:
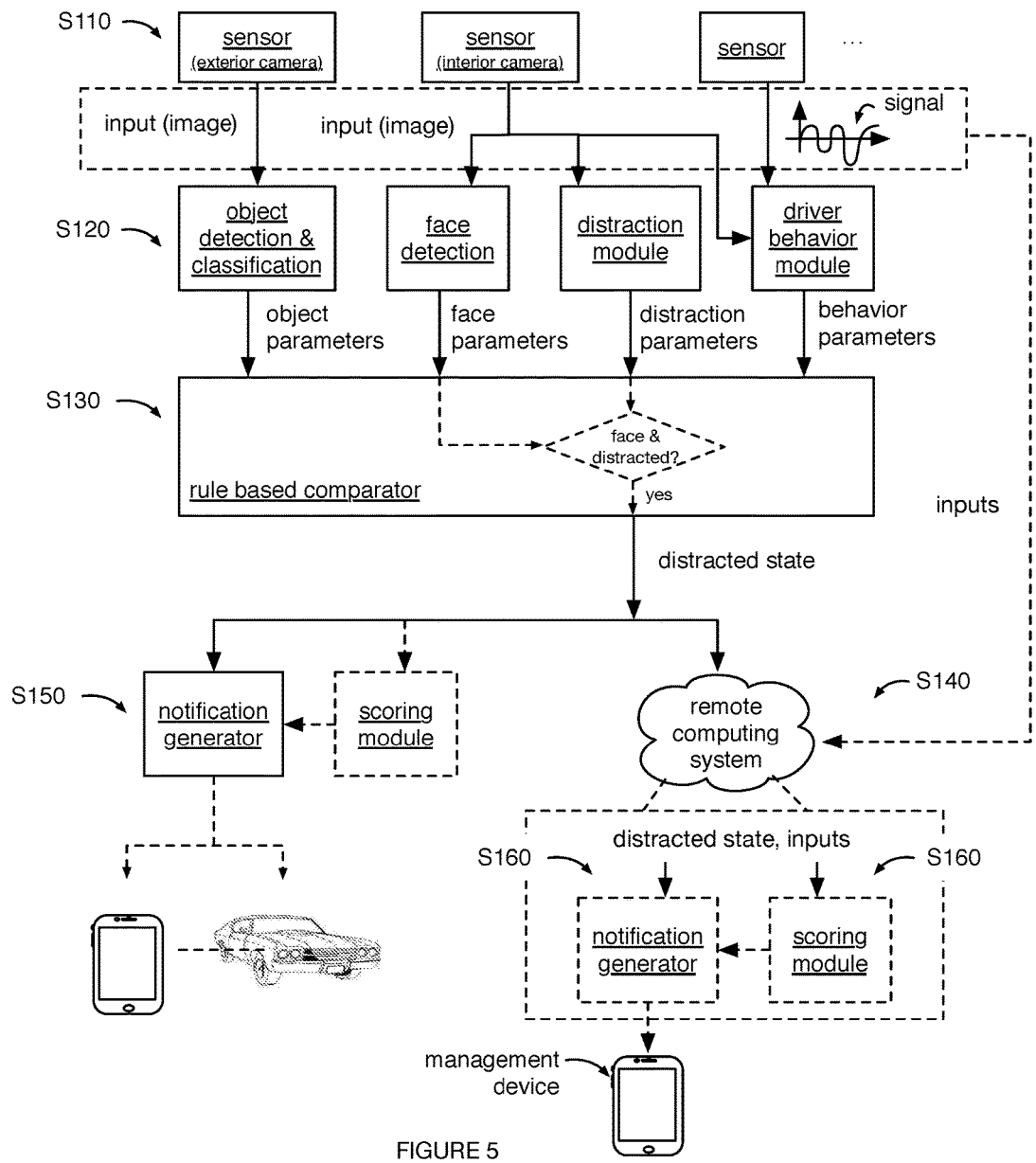
FIG. 5 is a schematic depiction of an example information and processing flow path associated with an example implementation of the method.

In one variation of the method, an example of which is shown in FIG. 5, the method can include sampling sensor measurements, wherein the sensor measurements include image data and signal data (e.g., time series signals). The method can include receiving the sampled sensor measurements at a plurality of modules, including an object detection and classification module, a face detection module, a distraction module, and a driver behavior module. In this variation, the face detection module determines whether a face is present in an input image (e.g., via a machine learning algorithm, via any suitable image processing technique, Hough transform, etc.) in parallel to determination of driver distraction by the distraction module, based on the sensor measurements received as inputs to the distraction module. The output of the face detection module (e.g., a binary output indicating that a face was or was not detected in the image) can be used to eliminate false positive outputs of the distraction module (e.g., in cases wherein a face is not detected, an indication that the driver is distracted that is output by the distraction module can be negated). The outputs of the object detection & classification module, the distraction module (e.g., checked against the output of the face detection module), and the driver behavior module (e.g., that determines driver and/or operator behavior substantially as described in U.S. application Ser. No. 15/705, 043, filed 14 Sep. 2017, which is incorporated herein in its entirety by this reference) can be received at a rule-based comparator, which functions in this variation to determine whether the driver is characterized by a distracted state, and can also function to determine the degree of distraction (e.g., severity, distraction score, etc.) based on the outputs of the modules. In this variation, the transformation of inputs (e.g., sensor measurements, outputs of upstream modules, etc.) to outputs is preferably performed continuously and in real- or near-real-time, but can additionally or alternatively be performed at any suitable frequency and/or with any suitable temporal characteristics (e.g., asynchronously, synchronously, in response to a trigger event, at a frequency of 4 Hz, at any suitable frequency, etc.).

Figure 6:
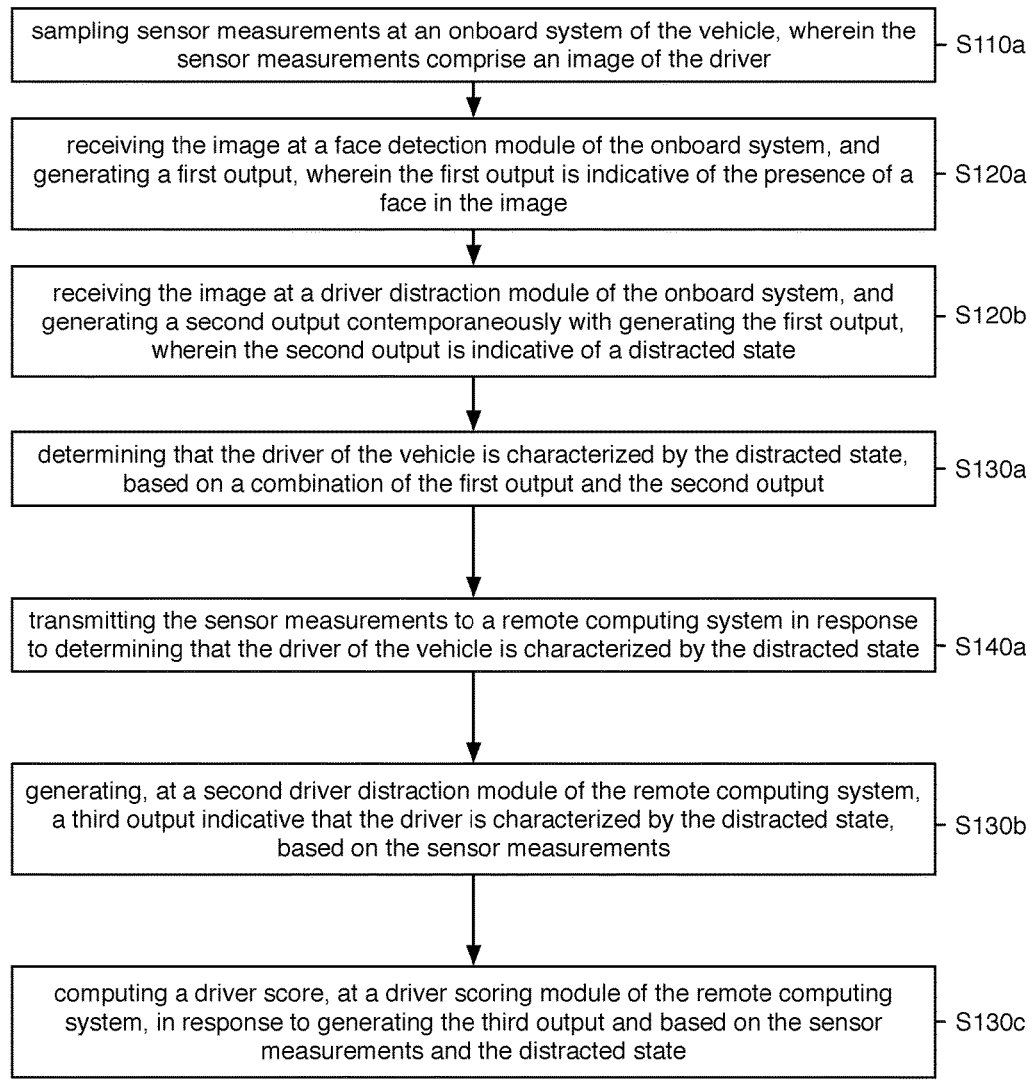
FIG. 6 is a flowchart representation of a specific example implementation of the method.

In a first specific example, as shown in FIG. 6, the method 100 includes sampling sensor measurements at an onboard system of the vehicle, wherein the sensor measurements comprise an image of the driver S110a; receiving the image at a face detection module of the onboard system, and generating a first output, wherein the first output is indicative of the presence of a face in the image S120a; receiving the image at a driver distraction module of the onboard system, and generating a second output contemporaneously with generating the first output, wherein the second output is indicative of a distracted state S120b; determining that the driver of the vehicle is characterized by the distracted state, based on a combination of the first output and the second output S130a; transmitting the sensor measurements to a remote computing system in response to determining that the driver of the vehicle is characterized by the distracted state S140a; generating, at a second driver distraction module of the remote computing system, a third output indicative that the driver is characterized by the distracted state, based on the sensor measurements S130b; computing a driver score, at a scoring module of the remote computing system, in response to generating the third output and based on the sensor measurements and the distracted state S130c.

Figure 7:
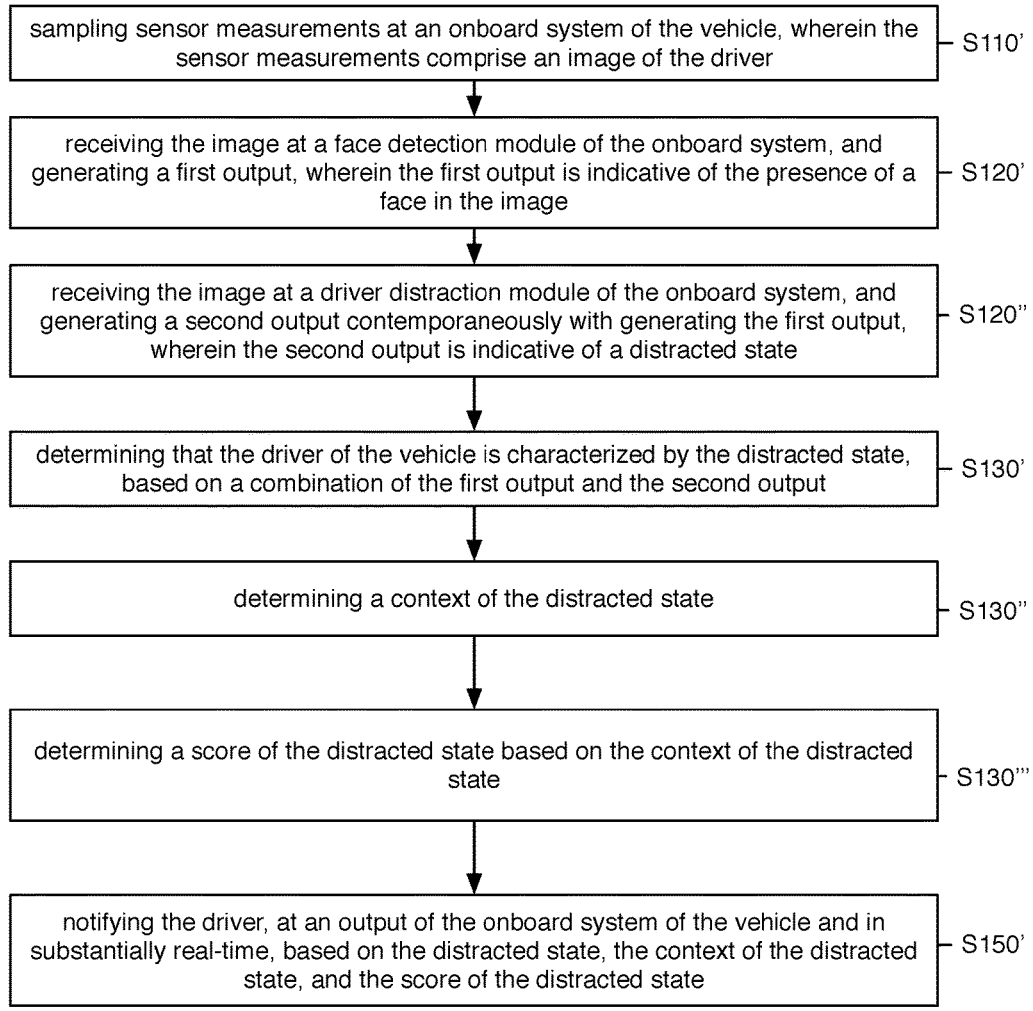
FIG. 7 is a flowchart representation of a specific example implementation of the method.

In a second specific example, as shown in FIG. 7, the method 100 includes sampling sensor measurements at an onboard system of the vehicle, wherein the sensor measurements comprise an image of the driver S110'; receiving the image at a face detection module of the onboard system, and generating a first output, wherein the first output is indicative of the presence of a face in the image S120'; receiving the image at a driver distraction module of the onboard system, and generating a second output contemporaneously with generating the first output, wherein the second output is indicative of a distracted state S120''; determining that the driver of the vehicle is characterized by the distracted state, based on a combination of the first output and the second output S130'; determining a context of the distracted state S130''; determining a score of the distracted state based on the context of the distracted state S130'''; notifying the driver, at an output of the onboard system of the vehicle and in substantially real-time, based on the distracted state, the context of the distracted state, and the score of the distracted state S150'.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for determining distraction of a driver of a vehicle, comprising:
   sampling sensor measurements at an onboard system of the vehicle, wherein the sensor measurements comprise an image of the driver;
   receiving the image at a face detection module of the onboard system, and generating a first output, wherein the first output is binary between one of a presence and an absence of a face in the image;
   receiving the image at a driver distraction module of the onboard system, and generating a second output indicative of a distracted state depicted in the image based on identifying a gaze direction of the driver, and wherein the second output is generated in parallel with and independently of the first output;
   determining that the driver of the vehicle is characterized by the distracted state, based on a combination of the first output, wherein the first output indicates the presence of the face in the image, and the second output;
   determining a duration of the gaze direction;
   determining a score of the distracted state based on the duration of the gaze direction exceeding a threshold duration; and
   notifying the driver, at an output of the onboard system of the vehicle and in substantially real-time, based on the distracted state and the score of the distracted state.

2. The method of claim 1, wherein the threshold duration is predetermined by a remote entity associated with the driver, and further comprising transmitting a notification to the remote entity based on the determined score of the distracted state.

3. The method of claim 1, wherein the sensor measurements comprise an accelerometer output, and further comprising:
   determining driver behavior at a driver behavior analysis module of the onboard system based on the accelerometer output; and
   wherein determining that the driver of the vehicle is characterized by the distracted state is based on the determined driver behavior.

4. The method of claim 1, further comprising transmitting the sensor measurements to a remote computing system in response to the score of the distracted state exceeding a threshold score.

5. The method of claim 4, wherein transmitting the sensor measurements to the remote computing system is performed substantially instantaneously subsequent to determining that the score of the distracted state exceeds the threshold score.

6. The method of claim 4, further comprising processing the sensor measurements at a second driver distraction module of the remote computing system to generate a third output indicative that the driver is characterized by the distracted state.

7. The method of claim 6, further comprising transmitting a notification to a remote entity associated with the driver, in response to generating the third output, wherein the notification comprises the distracted state, the score of the distracted state, the context of the distracted state, and a time point of distracted state determination.

8. The method of claim 4, further comprising computing a driver score, at a scoring module of the remote computing system, based on the sensor measurements, the determined score, and a time history of scores associated with the driver.

9. A method for determining distraction of a driver of a vehicle, comprising:
sampling sensor measurements at an onboard system of the vehicle, during a driving session, wherein the sensor measurements comprise a sequence of images including an image of the driver;
receiving the image at a face detection module of the onboard system, and generating a first output, wherein the first output is binary between one of a presence and an absence of a face in the image;
receiving the sequence of images at a driver distraction module of the onboard system, and generating a second output indicative of a distracted state depicted in the image based on computing a rate of change of a gaze direction of the driver from the sequence of images, wherein the second output is generated in parallel with and independently of the first output;
determining that the driver of the vehicle is characterized by the distracted state, based on a combination of the first output, wherein the first output indicates the presence of the face in the image, and the second output;
transmitting the sensor measurements to a remote computing system in response to determining that the driver of the vehicle is characterized by the distracted state;
processing the sensor measurements at a second driver distraction module of the remote computing system to generate a third output indicative that the driver is characterized by the distracted state;
computing a driver score, at a scoring module of the remote computing system, in response to generating the third output and based on the sensor measurements and the distracted state.

10. The method of claim 9, wherein transmitting the sensor measurements to the remote computing system is performed substantially instantaneously subsequent to determining that the driver of the vehicle is characterized by the distracted state.

11. The method of claim 9, further comprising determining a context of the distracted state, at the onboard system of the vehicle, based on the sensor measurements.

12. The method of claim 11, wherein the sensor measurements further comprise a second image of a region in front of the vehicle, and wherein determining the context of the distracted state comprises determining a following distance between a leading vehicle depicted in the second image and the vehicle.

13. The method of claim 11, wherein the context comprises a duration of the distracted state, wherein the distracted state comprises a difference between a gaze direction and a forward gaze direction, and further comprising determining a score of the distracted state based on the duration exceeding a threshold duration.

14. The method of claim 11, further comprising determining a score of the distracted state based on the context of the distracted state, wherein the score comprises a probability that the distraction state will lead to vehicle damage.

15. The method of claim 14, further comprising notifying the driver, at an output of the onboard system of the vehicle and in substantially real-time, based on the distracted state, the context of the distracted state, and the score of the distracted state.

16. The method of claim 14, wherein transmitting the sensor measurements to the remote computing system is performed in response to the score of the distracted state exceeding a threshold score.

17. The method of claim 9, further comprising transmitting a notification to a remote entity associated with the driver, in response to generating the third output, wherein the notification comprises the distracted state, a time point of distracted state determination, and the score.

* * * * *